H. C. HUBBELL.
PROCESS OF MAKING STORAGE BATTERY ELECTRODES.
APPLICATION FILED JUNE 5, 1911.

1,175,954.

Patented Mar. 21, 1916.

Attest:
M. A. Sistervelt
Alan R. McDonnell

Inventor:
by Harry Cross Hubbell
G. W. Cherry Atty.

UNITED STATES PATENT OFFICE.

HARRY CROSS HUBBELL, OF NEWARK, NEW JERSEY.

PROCESS OF MAKING STORAGE-BATTERY ELECTRODES.

1,175,954.  Specification of Letters Patent.  Patented Mar. 21, 1916.

Application filed June 5, 1911. Serial No. 631,271.

*To all whom it may concern:*

Be it known that I, HARRY CROSS HUBBELL, a citizen of the United States, residing at Newark, in the county of Essex and State of New Jersey, have invented certain new and useful Improvements in Processes of Making Storage-Battery Electrodes, of which the following is a specification.

My present invention relates to an improved electrode and process of making the same, said invention so far, being of general application unlimited to specific materials. Finally, I have claimed herein a specific electrode and its process of manufacture, said electrode being a nickel electrode which is oxidized on charge. Incidentally, I have described a number of other varieties of electrode within the broad invention and which I make the object of specific protection in other applications.

Figure 1:
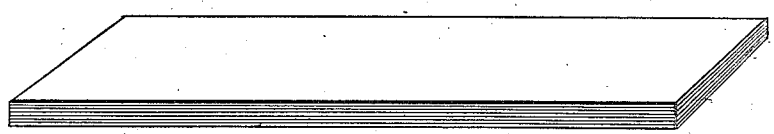
Figure 3:
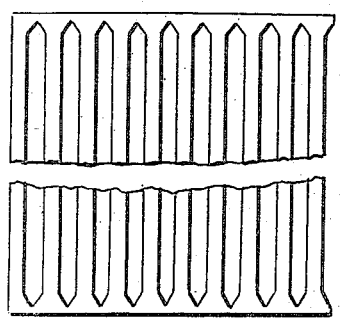
Figure 4:
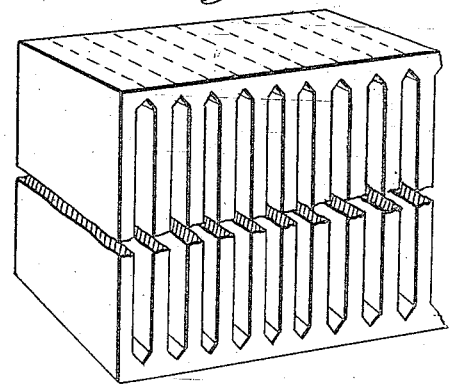
Figure 2:
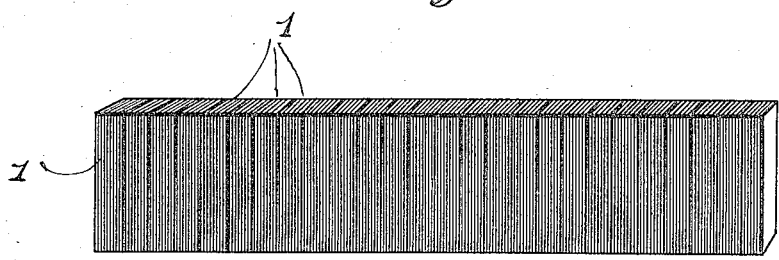

In the drawings, Figure 1 shows a plate consisting of alternating layers of different metals; and Fig. 2 shows this plate after it has been cut up into a plurality of bars 1, as along the lines 1' of Fig. 1, and all of these bars have been rearranged to form a storage battery plate wherein the layers are disposed edgewise to the faces 2 and 3, that is, in Fig. 2 the surfaces 4—4 are arranged in abutment of the plate. Fig. 3 is a detail view on a greatly enlarged scale of a portion of the plate showing the fused ends and with the copper still located therein. Fig. 4 is a detail perspective view on a greatly enlarged scale of a portion of the plate after the copper is dissolved out of the same.

I will now describe specific methods of practising my generic process for making the plates of storage battery electrodes and further will describe the resulting plates, reserving it to the claims to point out and define the scope of the invention, it being understood that the claims will be given due range of equivalents.

The first plate and process which I will describe will be the specific nickel plate oxidized on charge which I have hereinafter claimed. To make this plate I start with a sheet made up in any well known manner of alternate layers of copper and nickel, the layers being preferably of film-like thickness. An obvious way of making this sheet will be by successive electro-depositions of the metals until the desired aggregate thickness is reached. Fig. 1 gives an idea of the nature of this sheet which is then cut up to make the bars 1 shown in Fig. 2 which are then arranged side by side to form the electrode-plate with their layers directed edgewise to the faces of the plate. Each set of ends of the bars are then integrally united preferably by fusing them with an oxyhydrogen or acetylene flame so that each set of ends are in perfect electrical connection along the side edges of the plate. Fig. 2 illustrates how this assembling of the bars produces the electrode-plate, a convenient size for which is one inch by five inches by three-sixteenths of an inch thick. I now dissolve out the copper layers and prefer to do this by making the plate an anode in an electrolyte made up of sodium acetate and ammonium acetate to which ammonia is continually added so that there is always free ammonia. The strength of the electrolyte may vary, but I have found that a concentration of 5 to 10 degrees B. is suitable with a use of equal proportions of the sodium acetate and ammonium acetate ingredients.

Instead of the above electrolyte, there may be used others such as sodium carbonate in the presence of free ammonia. This is good but slower than the other electrolyte.

The current density should be kept low enough so that the nickel is not attacked. The result is that the copper layers are dissolved out of the plate and this operation is completed when the electrolyte ceases to turn blue in a half hour or so after the addition of ammonia.

The plate now consists of numerous strips of film-like thickness of nickel integrally united at their ends, said strips being arranged in close parallelism and in edgewise relation to the faces of the plate. The plate is now washed with hot water to get rid of salts. The nickel strips are then superficially oxidized to coat them with active material. This I prefer to accomplish by using the plate as an anode in a dilute solution of phenol containing a percentage of alkaline phenolate, and during the operation I use a low current density or so-called "forming" current, the object being to form a coating of oxid on the surfaces of all of the nickel strips which, it will be noted, aggregate a very large total surface in minimum space.

Instead of oxidizing the nickel in an electrolyte which is acid with phenol, I may also use a dilute alkaline solution of sodium chlorid, sulfate or nitrate, as well as possibly other electrolytes.

Instead of using alternating layers of copper, I may use with the nickel, layers of some other metal having the relative solubility of copper, such as cadmium with appropriate modifications in the process.

Describing now another variety of plate within the broad invention, I may start with a sheet of alternating layers of cadmium and nickel, cut this up as above into bars which are likewise assembled as before into plates. I then convert the cadmium layers into active material; for example, I may heat the plate to a dull heat in the air below the distilling point of cadmium, the heating being preferably accomplished on a hot plate. This converts the cadmium layers into cadmium oxid, and I then have a cadmium plate ready for use as part of an electrode wherein the cadmium active material is in intimate contact with conducting strips of nickel.

Instead of oxidizing the cadmium by the agency of heat, I may oxidize it electrolytically by making the plate an anode in a suitable electrolyte. This plate is for an electrode which is oxidized on discharge. Instead of alternating the cadmium with layers of nickel, I may substitute for the nickel another more electro-negative metal than cadmium in an alkaline electrolyte, such as cobalt, iron, tin or copper, in which event these latter metals constitute the conducting strips between which the cadmium oxide is intimately supported.

As another variety of plate I may start with a sheet of alternate layers of iron and cadmium, and assemble bars made therefrom to form the plate in the same manner as heretofore. I then may distil out the cadmium layers, leaving the iron which I may then superficially form with electrolytically active oxide by making the plate an anode in an electrolyte acid with phenol or some other suitable electrolyte as heretofore described. This gives an iron plate and the same result may be obtained by substituting for the cadmium some other suitable metal such as alternating layers of zinc, adapted to be electrolytically dissolved in an alkaline solution; or by substituting alternating layers of tin which are also adapted to be removed like the zinc as a preparatory step to replacing same with the iron active material.

As a final illustration, instead of having nickel and copper layers, or the equivalent of the latter, directly alternating with each other, I prefer to alternate layers of cobalt with these, so that the succession of layers is copper, cobalt, nickel, cobalt, copper, cobalt, nickel, cobalt, copper, etc.; the bars being assembled as before, I then similarly dissolve out the copper layers, preferably by electrolytic oxidation in the presence of free ammonia. Then I oxidize the cobalt layers which, it will be noted, cover both sides of the nickel layers. This oxidation I accomplish as heretofore described in connection with the oxidation of the nickel plate but with the advantage that cobalt being easier to oxidize, the forming of the active material progresses more readily and all or substantially all of the cobalt can be oxidized, so that the plate consists of cobalt active material supported by nickel conducting strips.

What I claim is:—

1. The process of making storage battery electrodes consisting in making bars which consist of electro-deposited layers of alternately different metals running lengthwise of the bars, and then in uniting said bars into a plate with the layers disposed edgewise to the faces of the plate, and dissolving out one set of metal layers and superficially oxidizing the remaining layers.

2. The process of making storage battery electrodes which comprises making bars consisting of electro-deposited alternating layers of nickel and a more soluble metal than nickel, said layers running lengthwise of the bars; uniting them into a plate with the layers disposed edgewise to the faces of the plate, dissolving out the copper layers and superficially oxidizing the nickel.

3. The process of making storage battery electrodes consisting in uniting into a plate layers of nickel and a more soluble metal than nickel with the layers disposed edgewise to the faces of the plate, dissolving out the copper lays by electrolytic oxidation in the presence of free ammonia and finally electrolytically oxidizing the nickel.

4. The process of making storage battery electrodes consisting in uniting into a plate layers of nickel and a more soluble metal than nickel with the layers disposed edgewise to the faces of the plate, dissolving out the copper layers by using the plate as an anode in a sodium acetate and ammonium acetate solution containing free ammonia at a current density sufficiently low so as not to attack the nickel and finally oxidizing the nickel.

5. The process of making storage battery electrodes consisting in uniting into a plate layers of nickel and a more soluble metal than nickel with the layers disposed edgewise to the faces of the plate, dissolving out the copper layers by using the plate as an anode in a sodium acetate and ammonium acetate solution containing free ammonia at a current density sufficiently low so as not to attack the nickel and finally oxidizing the nickel, by using the plate as an anode in a dilute solution of phenol and fixed alkali using a low density "forming" current.

6. The process of making a storage battery electrode consisting in uniting into a plate layers of alternately different metals with the layers disposed edgewise to the faces of the plate, dissolving out one set of metal layers, and superficially oxidizing the remaining layers.

7. The process of making storage battery electrodes consisting in uniting into a plate layers of alternately different metals with the layers disposed edgewise to the faces of the plate, then subjecting one set of metal layers to an eliminating process, and superficially oxidizing the remaining layers.

In testimony whereof I have affixed my signature in presence of two witnesses.

HARRY CROSS HUBBELL.

Witnesses:
E. W. SCHERR, Jr.,
ALAN C. McDONNELL.